(12) United States Patent
Szczepanski (10) Patent No.: US 10,690,071 B1
(45) Date of Patent: Jun. 23, 2020

(54) CONTROL SYSTEM FOR VARIABLE DISPLACEMENT ENGINE

(71) Applicant: DENSO International America, Inc., Southfield, MI (US)

(72) Inventor: Edward Szczepanski, Grosse Pointe Woods, MI (US)

(73) Assignee: DENSO International America, Inc., Southfield, MI (US)

( * ) Notice: Subject to any disclaimer, the term of this patent is extended or adjusted under 35 U.S.C. 154(b) by 34 days.

(21) Appl. No.: 16/218,093

(22) Filed: Dec. 12, 2018

(51) Int. Cl.
| | | |
|---|---|---|
| F02D 41/00 | (2006.01) | |
| F02D 17/02 | (2006.01) | |
| F02D 13/06 | (2006.01) | |
| F02D 13/02 | (2006.01) | |
| F02D 41/02 | (2006.01) | |
| F01N 3/08 | (2006.01) | |

(52) U.S. Cl.
CPC ......... *F02D 41/0087* (2013.01); *F02D 13/02* (2013.01); *F02D 13/06* (2013.01); *F02D 17/02* (2013.01); *F02D 41/0055* (2013.01); *F02D 41/024* (2013.01); *F02D 41/0235* (2013.01); *F02D 41/0255* (2013.01); *F01N 3/0814* (2013.01); *F02D 2200/0802* (2013.01)

(58) Field of Classification Search
CPC .. F02D 13/06; F02D 2013/0292; F02D 17/02; F02D 41/0087; F02D 41/0235; F02D 41/024; F02D 41/0255; F01N 3/2006
See application file for complete search history.

(56) References Cited

U.S. PATENT DOCUMENTS

| | | | |
|---|---|---|---|
| 5,526,793 A | 6/1996 | Johansson | |
| 5,721,375 A | 2/1998 | Bidner | |
| 5,930,992 A * | 8/1999 | Esch .................. | F02D 41/068 |
| | | | 60/274 |
| 6,857,264 B2 | 2/2005 | Ament | |
| 6,922,986 B2 | 8/2005 | Rozario | |
| 7,007,457 B2 | 3/2006 | Ellmer | |
| 7,677,027 B2 | 3/2010 | Iida et al. | |
| 7,918,085 B2 | 4/2011 | Yoshioka | |
| 9,200,587 B2 | 12/2015 | Serrano | |
| 9,239,037 B2 | 1/2016 | Carlson et al. | |
| 9,670,819 B2 | 6/2017 | Aoki et al. | |
| 9,778,160 B2 | 10/2017 | Zhang | |
| 9,790,867 B2 | 10/2017 | Carlson et al. | |
| 9,891,137 B2 | 2/2018 | Chen et al. | |
| 9,896,988 B2 | 2/2018 | Lee | |

(Continued)

FOREIGN PATENT DOCUMENTS

| | | |
|---|---|---|
| DE | 102005049069 A1 | 4/2007 |
| DE | 102011088843 A1 | 6/2013 |
| WO | 2019238246 A1 | 12/2019 |

*Primary Examiner* — Sizo B Vilakazi
*Assistant Examiner* — Anthony L Bacon
(74) *Attorney, Agent, or Firm* — Brooks Kushman P.C.

(57) ABSTRACT

A vehicle includes an internal combustion engine, a conduit, and a controller. The internal combustion engine has a plurality of cylinders. The conduit is configured to channel exhaust gas away from the cylinders and to a catalyst. The controller is programmed to, in response to starting the engine and a temperature of the catalyst being less than a threshold, operate a first of the plurality of cylinders alone followed by operating the first and a second of the plurality of cylinders alone to increase the temperature of the catalyst toward the threshold.

20 Claims, 6 Drawing Sheets

(56) References Cited

U.S. PATENT DOCUMENTS

| | | |
|---|---|---|
| 9,982,611 B2 | 5/2018 | Tripathi et al. |
| 10,215,115 B1 | 2/2019 | Ranga et al. |
| 10,323,562 B2 | 6/2019 | Van Nieuwstadt et al. |
| 2002/0069638 A1* | 6/2002 | Glugla ............... F02B 75/22 60/284 |
| 2002/0129597 A1* | 9/2002 | Glugla ............... F01N 3/2006 60/274 |
| 2004/0098970 A1* | 5/2004 | Foster ............... F01N 3/023 60/284 |
| 2004/0221832 A1 | 11/2004 | Takahashi et al. |
| 2004/0255905 A1 | 12/2004 | Bauerle et al. |
| 2006/0053772 A1 | 3/2006 | Dou et al. |
| 2006/0243040 A1 | 11/2006 | Reed et al. |
| 2007/0051092 A1 | 3/2007 | Pallett et al. |
| 2007/0051351 A1 | 3/2007 | Pallett et al. |
| 2007/0240695 A1 | 10/2007 | Mitsuda et al. |
| 2008/0243362 A1 | 10/2008 | Mitsuda et al. |
| 2009/0094963 A1 | 4/2009 | Mizoguchi et al. |
| 2009/0118985 A1 | 5/2009 | Whitney et al. |
| 2009/0306846 A1 | 12/2009 | Jeong |
| 2010/0031738 A1 | 2/2010 | Feldkamp et al. |
| 2010/0154738 A1 | 6/2010 | Tsukamoto et al. |
| 2010/0175462 A1 | 7/2010 | Doering et al. |
| 2010/0175463 A1 | 7/2010 | Doering et al. |
| 2010/0288037 A1 | 11/2010 | Gibson et al. |
| 2012/0173122 A1 | 7/2012 | Nishikiori et al. |
| 2014/0041630 A1* | 2/2014 | Carlson ............... F02P 9/00 123/406.12 |
| 2014/0163841 A1 | 6/2014 | Sane |
| 2014/0261309 A1 | 9/2014 | Chen et al. |
| 2014/0360477 A1 | 12/2014 | Doering et al. |
| 2014/0366835 A1 | 12/2014 | Walter |
| 2015/0051816 A1* | 2/2015 | Glugla ............... F02D 41/0055 701/108 |
| 2015/0369155 A1 | 12/2015 | Ueda |
| 2016/0061127 A1 | 3/2016 | Chen et al. |
| 2016/0115884 A1* | 4/2016 | VanDerWege ......... F02P 9/002 123/481 |
| 2016/0195031 A1 | 7/2016 | Willems et al. |
| 2016/0222899 A1* | 8/2016 | Glugla ............... F02D 41/024 |
| 2016/0258375 A1 | 9/2016 | Jammoussi et al. |
| 2016/0258376 A1 | 9/2016 | Jammoussi et al. |
| 2016/0333809 A1 | 11/2016 | Jammoussi et al. |
| 2017/0321587 A1 | 11/2017 | Marlett et al. |
| 2017/0350332 A1 | 12/2017 | Martin et al. |
| 2017/0356353 A1 | 12/2017 | Rollinger et al. |
| 2017/0356363 A1 | 12/2017 | Jammoussi et al. |
| 2017/0356368 A1 | 12/2017 | Richards et al. |
| 2017/0356370 A1 | 12/2017 | Doering et al. |
| 2017/0356374 A1 | 12/2017 | Rollinger et al. |
| 2017/0356380 A1 | 12/2017 | Surnilla et al. |
| 2017/0370308 A1 | 12/2017 | Hashemi et al. |
| 2018/0080398 A1 | 3/2018 | Leone |
| 2018/0216562 A1 | 8/2018 | Dudar |
| 2018/0230914 A1 | 8/2018 | McCarthy, Jr. et al. |
| 2018/0274471 A1 | 9/2018 | Dudar |
| 2019/0033170 A1 | 1/2019 | Dudar |
| 2019/0186401 A1 | 6/2019 | Dudar |
| 2019/0218989 A1 | 7/2019 | Dudar |
| 2019/0264628 A1 | 8/2019 | Dudar |
| 2019/0271265 A1 | 9/2019 | Iannone et al. |
| 2019/0339164 A1 | 11/2019 | Kupiec et al. |
| 2019/0390610 A1 | 12/2019 | Ulstad et al. |

* cited by examiner

CONTROL SYSTEM FOR VARIABLE DISPLACEMENT ENGINE

TECHNICAL FIELD

The present disclosure relates to control systems for variable displacement or skip-fire internal combustion engines.

BACKGROUND

One or more cylinders in a variable displacement internal combustion engine may be shut down or deactivated while the engine is operating, which results in the engine being powered by less than all the cylinders.

SUMMARY

A vehicle includes an internal combustion engine, a conduit, and a controller. The internal combustion engine has a plurality of cylinders. The conduit is configured to channel exhaust gas away from the cylinders and to a catalyst. The controller is programmed to, in response to starting the engine and a temperature of the catalyst being less than a threshold, operate a first of the plurality of cylinders alone followed by operating the first and a second of the plurality of cylinders alone to increase the temperature of the catalyst toward the threshold.

A method of heating a catalyst in a vehicle includes, in response to starting an engine and a temperature of the catalyst being less than a threshold, operating a first of a plurality of cylinders in the engine alone to produce exhaust gas to increase the temperature of the catalyst toward the threshold, and operating the first and a second of the plurality of cylinders in the engine alone, after operating the first cylinder alone, to produce exhaust gas to increase the temperature of the catalyst toward the threshold, wherein the second cylinder is adjacent to the first cylinder.

A vehicle includes an internal combustion engine, an exhaust pipe, and a controller. The internal combustion engine has first and second banks of cylinders. The exhaust pipe is configured to channel exhaust gas away from the first bank of cylinders and to a catalytic converter. The controller is programmed to, in response to starting the engine and a temperature of the catalyst being less than a threshold, operate a first cylinder from the first bank of cylinders alone followed by operating the first cylinder and a second cylinder from first bank of cylinders alone to increase the temperature of the catalytic converter toward the threshold.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
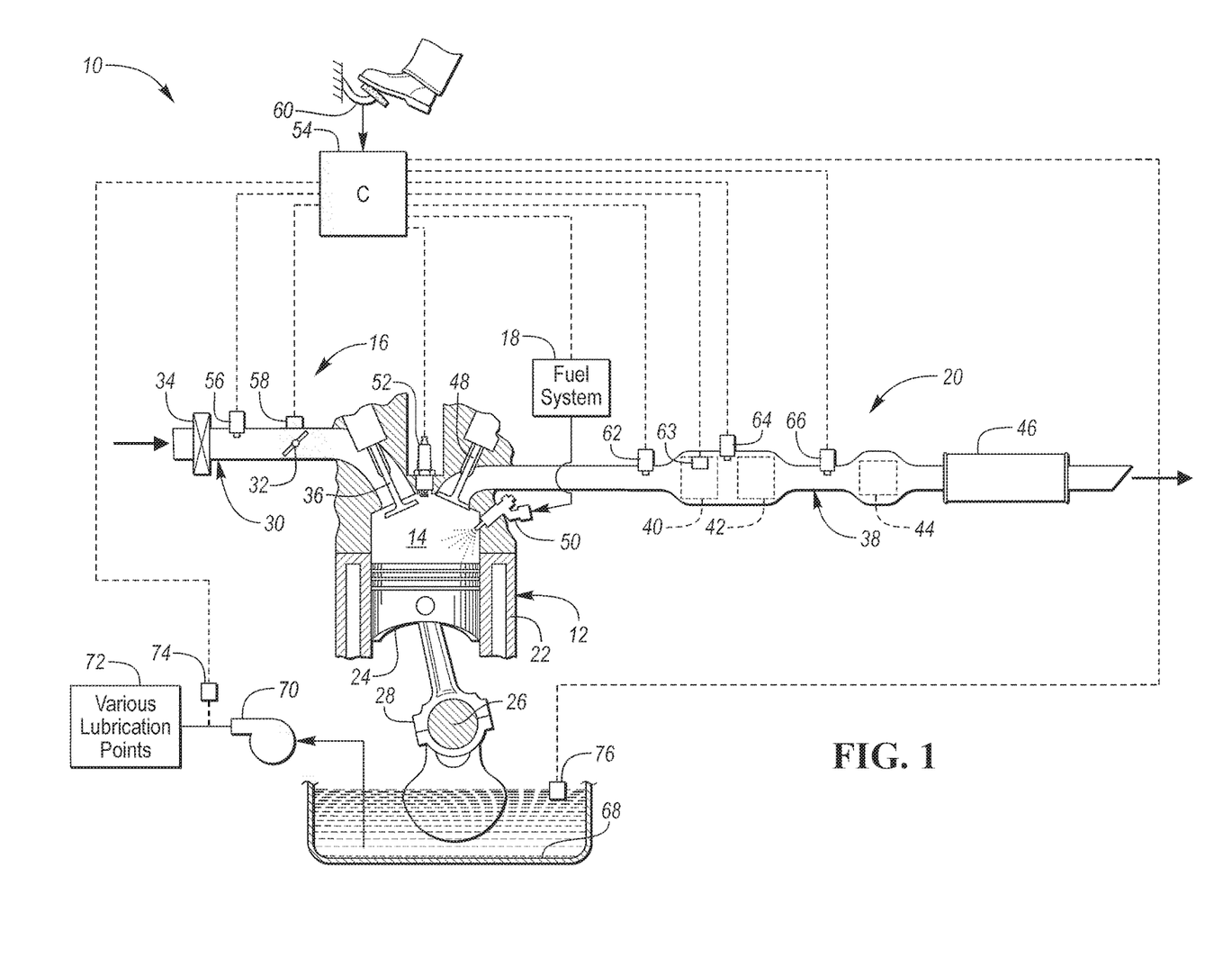
FIG. 1 is a schematic illustration of a vehicle including a single cylinder of an internal combustion engine that has multiple cylinders, an air intake system, a fuel delivery system, and an exhaust system.
Figure 2:
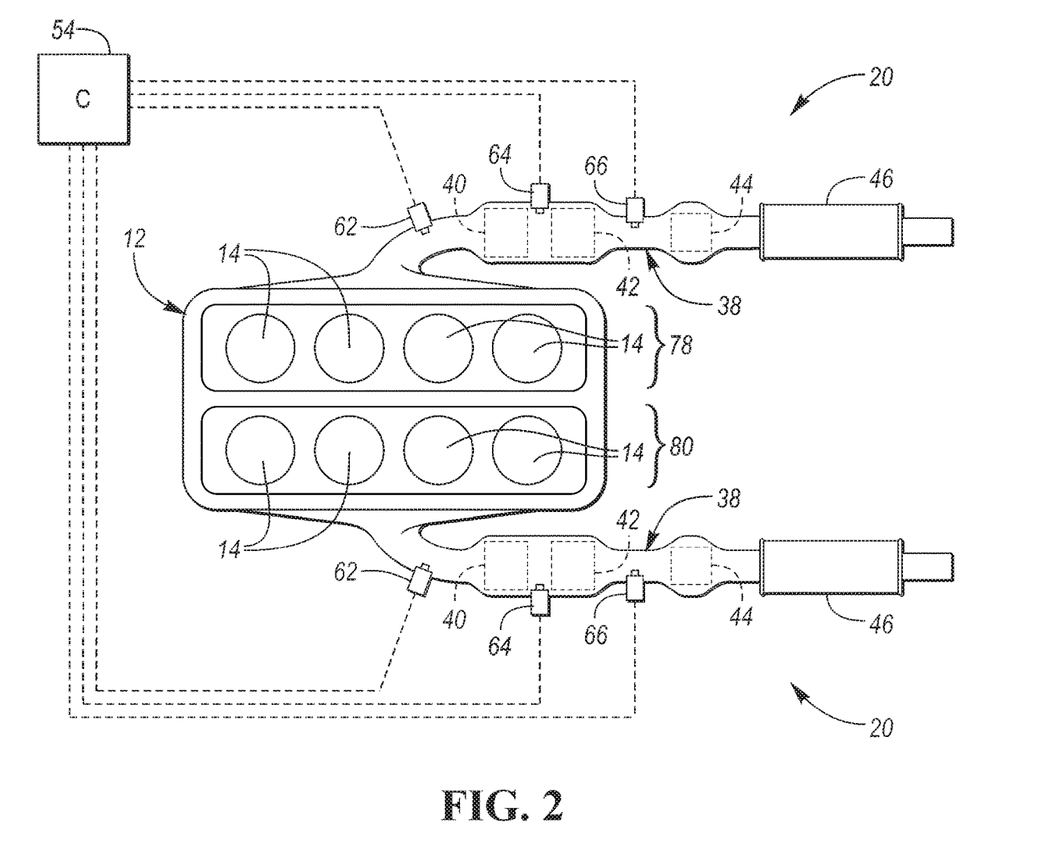
FIG. 2 is a schematic illustration of the multiple cylinders of the internal combustion engine and the exhaust system.

Referring to FIGS. 1 and 2, a vehicle 10 and an internal combustion engine 12 that includes multiple cylinders are illustrated. The schematic of FIG. 1 illustrates a single cylinder 14 of the internal combustion engine 12, an air intake system 16, a fuel delivery system 18, and an exhaust system 20. The schematic of FIG. 2 illustrates the multiple cylinders 14 of the engine 12 and the exhaust system of the engine 12. It should be understood that the single cylinder 14 illustrated in FIG. 1 may be representative of one or all of the cylinders 14 of the engine 12. It should further be understood, that the air intake system 16 and fuel delivery system 18 illustrated in FIG. 1 are representative of the systems that deliver air and fuel, respectively, to all of the cylinders 14 of the engine 12, while the exhaust system 20 illustrated in FIG. 1 is representative of the system that channels exhaust gas away from all of the cylinders 14 of the engine 12.

The engine 12 includes an engine block 22 that defines each of the cylinders 14. A piston 24 is disposed within each of the cylinders 14. The pistons 24 are configured to transfer the energy that results from combusting fuel within each cylinder 14 into kinetic energy, which is utilized to rotate a crankshaft 26. Each piston 24 is connected to the crankshaft 26 via a connecting rod 28. The crankshaft 26 then transfers the rotational energy to one or more drive wheels (not shown) of the vehicle 10 in order to propel the vehicle 10. Intermediate components, such as driveshafts, a torque converter, a transmission gearbox, universal joints, differentials, etc. may be disposed between the crankshaft 26 and the drive wheels. The intermediate components are configured to transfer the rotational power of the crankshaft 26 to the drive wheels.

The air intake system 16 includes one or more manifolds, pipes, ducts, or conduits 30 that are configured to channel air from the ambient surroundings and into the cylinders 14. The amount of air that is being channeled into the cylinders 14 may be controlled by the throttle valve 32. An air filter 34 may be disposed proximate to the intake of the air intake system 16. Each of the cylinders 14 includes an air intake valve 36 is that is configured to establish fluid communication between the cylinder 14 and the air intake system 16 when in an opened position and isolate the cylinder 14 from the air intake system 16 when in a closed position. The air intake valve 36 of each cylinder 14 will be in an opened position during the intake stroke of the respective piston 24 and closed during the compression, combustion, and exhaust strokes of the respective piston 24.

The exhaust system 20 includes one or more manifolds, pipes, ducts, or conduits 38 there configured to channel exhaust gas away from the cylinders 14 and to the ambient surroundings. The exhaust system 20 includes a first catalyst 40 (or first catalytic converter) that is configured to reduce the amount of emissions (e.g., $NO_x$ gases or unspent hydrocarbons) in the exhaust gas that is channeled to the ambient air or surroundings. The exhaust system 20 may include a second catalyst 42 (or second catalytic converter) that is configured to further reduce the amount of emissions in the exhaust gas that are channeled to the ambient air or surroundings. The second catalyst 42 may be a redundant catalyst that only further reduces the emissions in the exhaust when the first catalyst 40 is not operating at full capacity or has some malfunction. The exhaust system 20 may further include a particulate filter 44 that is configured to reduce particulate matter in the exhaust and a muffler 46 that is configured to reduce noise. The particulate filter 44 and the muffler 46 may each be downstream of the first catalyst 40 and the second catalyst 42. Each of the cylinders 14 includes an exhaust valve 48 is that is configured to establish fluid communication between the cylinder 14 and the exhaust system 20 when in an opened position and isolate the cylinder 14 from the exhaust system 20 when in a closed position. The exhaust valve 48 of each cylinder 14 will be in an opened position during the exhaust stroke of the respective piston 24 and closed during the intake, compression, and combustion strokes of the respective piston 24.

One or more camshafts (not shown) may be configured to open and close the air intake valve 36 and exhaust valve 48 of each cylinder 14. The camshafts may be connected to the crankshaft 26 by a gearing arrangement, belted arrangement, or some other arrangement to ensure that the air intake valves 36 and exhaust valves 48 are opening and closing when necessary. More specifically, the connection between the crankshaft 26 and the one or more camshafts will ensure that the air intake valve 36 of each cylinder 14 is in the opened position during the intake stroke of the respective piston 24 and closed during the compression, combustion, and exhaust strokes of the respective piston 24. The connection between the crankshaft 26 and the one or more camshafts will also ensure that the exhaust valve 48 of each cylinder 14 is in the opened position during the exhaust stroke of the respective piston 24 and closed during the intake, compression, and combustion strokes of the respective piston 24.

The first catalyst 40 and second catalyst 42 each may consist of a brick that is coated in alumina. The alumina in turn is coated with rhodium, cerium, and platinum or palladium. The rhodium is configured to reduce the amount $NO_x$ gases (combinations of nitrogen and oxygen such NO, $NO_2$, etc.) that are present within the exhaust. More specifically, the rhodium is configured to convert the $NO_x$ gases into nitrogen ($N_2$) and oxygen ($O_2$) by reacting the $NO_x$ gases with oxygen. The platinum or palladium is configured to reduce the amount of unspent hydrocarbons (e.g., $C_8H_{18}$ or $C_1H_4$) that are present within the exhaust. More specifically, the platinum or palladium is configured to convert the hydrocarbons into carbon dioxide ($CO_2$) and water ($H_2O$) by reacting the hydrocarbons with oxygen. The rhodium may also reduce the amount of unspent hydrocarbons within the exhaust, however, the rhodium is primarily utilized to reduce the amount of amount $NO_x$ gases that are present within the exhaust. The platinum or palladium may also reduce the amount of amount $NO_x$ gases that are present within the exhaust, however, the platinum or palladium is primarily utilized to reduce the amount of unspent hydrocarbons that are present within the exhaust. The cerium acts to store oxygen, which is then supplied to the rhodium and the platinum or palladium to effect the reactions described above to convert $NO_x$ gases into nitrogen ($N_2$) and oxygen ($O_2$) and to convert the unspent hydrocarbons into carbon dioxide ($CO_2$) and water ($H_2O$).

The particulate filter 44 is configured to filter any particulate matter out of the exhaust gas in order to prevent the particulate matter from being channeled to the ambient air or surroundings. Particulate matter may refer to any particle within the exhaust guest including rust, oil mixed with any solid material (e.g., metal shavings), simply oil by itself, carbon particles, suspended particulate matter (SPM), thoracic and respirable particles, inhalable coarse particles, which are coarse particles with a diameter between 2.5 and 10 micrometers (μm), fine particles with a diameter of 2.5 μm or less, ultrafine particles, soot (i.e., a mass of impure carbon particles resulting from the incomplete combustion of hydrocarbons), etc.

The fuel delivery system 18 is configured to deliver fuel to each of the cylinders 14. More specifically, the fuel delivery system may include a fuel tank for storing fuel, conduits that establish fluid communication between the fuel tank and fuel injectors 50, and a fuel pump that is configured to direct the fuel from the fuel tank, through the conduits, and to each of the fuel injectors 50. Each cylinder 14 also includes a spark plug 52 that is configured to ignite the air and fuel mixture that is within the cylinder 14 and push down on the respective piston 24 during the power stroke of the cylinder 14.

The vehicle 10 includes a controller 54, which may be a powertrain control unit (PCU). While illustrated as one controller, the controller 54 may be part of a larger control system and may be controlled by various other controllers throughout the vehicle 10, such as a vehicle system controller (VSC). It should therefore be understood that the controller 54 and one or more other controllers can collectively be referred to as a "controller" that controls various components of the vehicle 10 in response to signals from various sensors to control functions such as, shutting down one or more of the cylinders 14 of the engine 12 during a skip-fire mode, selecting or scheduling shifts of a vehicle transmission, adjusting the air-fuel mixture being delivered to the engine 12, etc.

The controller 54 may include a microprocessor or central processing unit (CPU) that is in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 54 in controlling the engine 12 or subcomponents of the vehicle 10.

The controller 54 may be configured to increase or decrease the power output of the engine 12. More specifically, the controller 54 may be configured to increase or decrease the power output of the engine 12 by increasing or decreasing the airflow and fuel flow into each cylinder 14. The airflow may be increased by adjusting the throttle valve 32 towards a fully open position or decreased by adjusting the throttle valve towards a fully closed position. The fuel flow may be increased by opening the fuel injectors 50 for longer periods of time during each injection of fuel into the cylinder 14 or decreased by opening the fuel injectors 50 for shorter periods of time during each injection of fuel into the cylinder 14. The controller 54 may also increase or decrease the power output of the engine 12 by either retarding or advancing the spark timing of the spark plugs 52.

A mass airflow sensor 56 may be configured to measure the amount of air flowing into the air intake system 16, which is eventually delivered to the cylinders 14, and communicate the amount of air flowing into the air intake system 16 to the controller 54. A throttle position sensor 58 may be configured to communicate the position of the throttle valve 32 to the controller 54. The controller 54 may also be in communication with each of the spark plugs 52, the fuel system 18, and each of the fuel injectors 50. Based on a power demand that is delivered to the controller 54, the controller may adjust the throttle valve 32 position to increase or decrease airflow into the cylinders 14, adjust the timing of the spark plugs 52, and/or adjust the amount of fuel being delivered into the cylinders 14 to either increase or decrease the power output of the engine 12 to meet the power demand. The power demand may be input into the controller 54 by an operator of the vehicle 10 when the operator engages an accelerator pedal 60. Under certain circumstances the power demand may be based on a pre-setting that is stored as control logic within the controller 54. For example, if the vehicle operator is not depressing the accelerator pedal 60 and the engine 12 is on, the amount of power the engine 12 is producing may be adjusted to a preset idle value.

Also, depending on power demand or for emission control purposes, the engine 12 may be configured to operate at a stoichiometric air-fuel mass ratio, a lean air-fuel mass ratio, or a rich air-fuel mass ratio. The air-fuel mass ratio may simply be referred to as the air-fuel ratio. Stoichiometric air-fuel mass ratio has a value of 14.7 to 1. A rich air-fuel mass ratio will be less than 14.7 to 1 and a lean air-fuel mass ration will be greater than 14.7 to 1. An air-fuel equivalence ratio ($\lambda$) has an air-fuel mass ratio that is stoichiometric when k is equal to 1, an air-fuel mass ratio that is rich when k is less than 1, and an air-fuel mass ratio that is lean when k is greater than 1. The air-fuel mass ratio may be controlled, via the controller 54, by adjusting the amount of air and fuel flowing into the cylinders 14.

A first lambda or oxygen sensor 62 may be disposed within the conduits 38 of the exhaust system 20 between the cylinders 14 and the first catalyst 40. The first oxygen sensor 62 may be a universal heated exhaust gas oxygen sensor. The first oxygen sensor 62 is configured to measure the amount of oxygen ($O_2$) that is within the exhaust gas exiting the cylinder 14. Based on the measured amount oxygen in the exhaust gas, the first oxygen sensor 62 generates a signal (e.g., a voltage or current) that correlates with the current air-fuel equivalence ratio ($\lambda$) that the engine 12 is operating at. The signal generated by the first oxygen sensor 62 may indicative of a lean, stoichiometric, or rich current air-fuel equivalence ratio ($\lambda$). The first oxygen sensor 62 communicates the air-fuel ratio or air-fuel equivalence ratio ($\lambda$) measurement to the controller 54, which provides a feedback control to the controller 54. The feedback control may include adjusting the air and/or fuel flowing (i.e., flow rates) into the cylinders 14 via the controller 54 if the air-fuel equivalence ratio ($\lambda$) measured by the first oxygen sensor 62 is different than the air-fuel equivalence ratio ($\lambda$) that is being commanded to the engine 12. More specifically, the feedback control may include adjusting the air and/or fuel flowing into the cylinders 14 to drive the air-fuel equivalence ratio ($\lambda$) that is being measured by the first oxygen sensor 62 toward the air-fuel equivalence ratio ($\lambda$) that is being commanded to the engine 12.

A second lambda or oxygen sensor 64, which has the same functionality as the first oxygen sensor 62, may be disposed within the conduits 38 of the exhaust system 20 between the first catalyst 40 and the second catalyst 42. The second oxygen sensor 64 is utilized to determine the efficiency at which the first catalyst 40 reduces the amount of emissions within the exhaust gas. The second oxygen sensor 64 is configured to communicate a signal that correlates with the measured air-fuel equivalence ratio ($\lambda$) of the exhaust gas back to the controller 54, after the exhaust gas has passed through the first catalyst 40. A particulate sensor 66 may be disposed within the conduits 38 of the exhaust system 20 between the second catalyst 42 and the particulate filter 44. The particulate sensor 66 is configured to measure the amount of particulate matter within the exhaust gas and communicate the measurement to the controller 54 in the form of a signal (e.g., a voltage or current).

One or more temperature sensors 63 may configured to measure the temperature of the first catalyst 40 and/or the second catalyst 42. The temperature sensors 63 are configured to communicate a signal that correlates with a measured temperature of the first catalyst 40 and/or the second catalyst 42 back to the controller 54.

The engine 12 also includes an oil pan or sump 68. An oil pump 70 is configured to direct oil out of the sump 68 and towards various lubrication points 72, such as any of the bearings, journals, valve stems, or any of the other moving parts within the engine 12. A pressure sensor 74 may be configured to measure the pressure of the oil that is being output from the oil pump 70. The pressure sensor 74 may then communicate the oil pressure to the controller 54. An oil level sensor 76 may be configured to measure the level of the oil within the pan or sump 68. The oil level sensor 76 may then communicate the level of the oil to the controller 54.

Referring to FIG. 2, the engine 12 is illustrated as an eight-cylinder engine that includes a first bank 78 of four cylinders 14 and a second bank 80 of four cylinders 14. The first bank 78 of cylinders includes an exhaust system 20 that is configured to channel the exhaust gas away from the first bank 78 of cylinders only. The second bank 80 of cylinders includes an exhaust system 20 that is configured to channel the exhaust gas away from the second bank 80 of cylinders only. Although FIG. 2 illustrates an eight-cylinder engine that includes two banks of cylinders where each bank has its own exhaust system 20, it should be understood that the engine 12 may include two or more cylinders that comprise of one or more banks of cylinders where each bank of cylinders may include a separate exhaust system.

The engine 12 may be a variable displacement engine or a skip-fire engine that may be controlled to shut down or deactivate one or more cylinders 14 while the engine 12 is operating, resulting in the engine 12 being powered by less than all the cylinders 14. Shutting down or deactivating a specific cylinder 14 a during skip-fire mode requires shutting down or deactivating the air intake valve 36, exhaust valve 48, spark plug 52, and the fuel injector 50. The engine 12 may be referred to as operating in a skip-fire mode when being powered by less than all of the cylinders 14. The cylinders 14 may be shut down or deactivated in any known pattern to increase the fuel efficiency when conditions are such that the engine 12 may effectively operate in the skip-fire mode to increase fuel efficiency without disturbing the driving requirements of the vehicle operator (e.g., when the number of cylinders can be reduced without reducing the speed of the vehicle). However, it may be desirable to shut down or deactivate the cylinders 14 based on the position of the cylinders 14 in order to directionally equalize the forces that are being transferred to the crankshaft 26 from the pistons 24. Furthermore, which of the cylinders 14 are shut down or deactivated and which of the cylinders 14 are operating may always be changing or rotating when in the skip-fire mode, which may also help to directionally equalize the forces that are being transferred to the crankshaft 26 from the pistons 24.

Figure 3A:
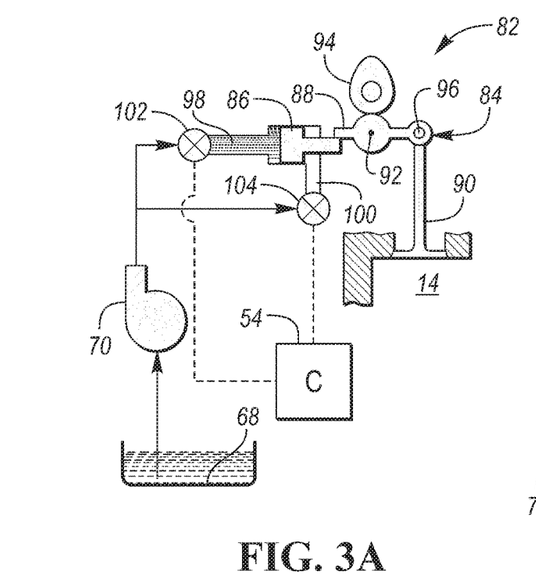
FIGS. 3A-3C illustrate a mechanism that is configured to disable the valves in a variable displacement engine.
Figure 3B:
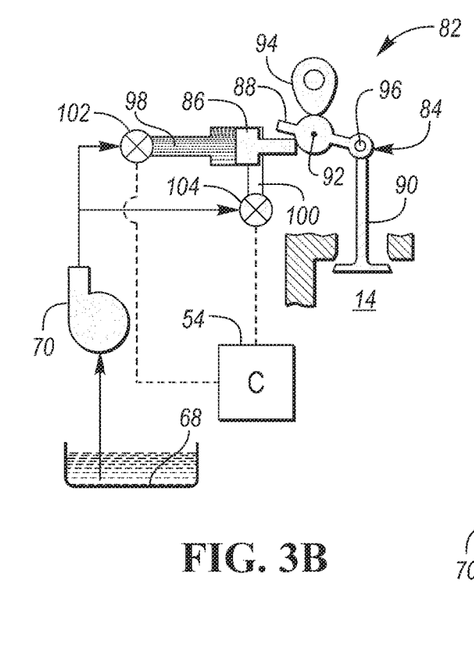
Figure 3C:
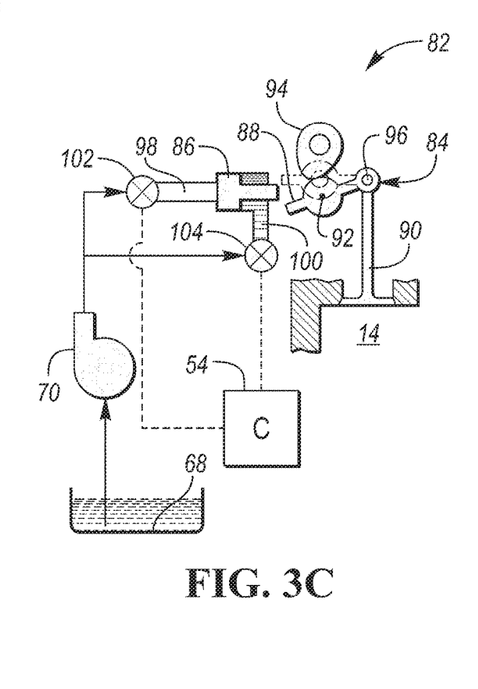

Referring to FIGS. 3A-3C a mechanism 82 that is configured to deactivate the air intake valves 36 and exhaust valves 48 in the variable displacement/skip-fire engine 12 is illustrated. During a skip-fire mode, if a particular cylinder 14 is shut down or deactivated, both the air intake valve 36 and the exhaust valve 48 of that particular cylinder 14 will also be deactivated (i.e., the air intake valve 36 and exhaust valve 48 will be in closed positions and disabled from transitioning to opened positions). The mechanism 82 includes a deactivation arm 84 and a locking pin 86. The locking pin 86 is configured to advance and engage a protrusion 88 that extends outward from the deactivation arm 84. The locking pin 86 is also configured to retract and disengage from the protrusion 88 that extends outward from the deactivation arm 84. A stem valve 90 is secured to an opposing side of the deactivation arm 84 relative to the protrusion 88. The stem valve 90 may be representative of both the air intake valves 36 and the exhaust valves 48.

The deactivation arm 84 will rotate about a first pivot 92 when engaged by a camshaft 94 while the locking pin 86 is engaging the protrusion 88. Rotation of the deactivation arm 84 about the first pivot 92 allows the stem valve 90 to transition between a closed position (see FIG. 3A) and an opened position (see FIG. 3B). The stem valve 90 as depicted in FIGS. 3A and 3B has not been deactivated (i.e., the stem valve 90 will transition between the opened and closed positions in response to rotation of the camshaft 94). The deactivation arm 84 will rotate about a second pivot 96, which rotatably secures the deactivation arm 84 to the stem valve 90, when engaged by the camshaft 94 while the locking pin 86 is disengaged from the protrusion 88. Rotation of the deactivation arm 84 about the second pivot 96 results in the stem valve 90 remaining in the closed position regardless of the position of the camshaft 94 and the position of the deactivation arm 84 (see FIG. 3C). The stem valve 90 as depicted in FIG. 3C has been deactivated (i.e., the stem valve 90 will remain in the closed position and will not transition between the opened and closed positions in response to engagement between the deactivation arm and the camshaft 94).

The locking pin 86 may be advanced and retracted by a pressurized fluid. The oil pump 70 may be configured to deliver pressurized oil to a first chamber 98 that is located on a first side of the locking pin 86 in order to advance the locking pin 86 such that the locking pin 86 engages the protrusion 88. The oil pump 70 may also be configured to deliver pressurized oil to a second chamber 100 that is located on a second side of the locking pin 86 in order to retract the locking pin 86 such that the locking pin 86 disengages from the protrusion 88. A first fluid valve 102 may be disposed within a conduit between the oil pump 70 and the first chamber 98. A second valve 104 may be disposed within a conduit between the oil pump in the second chamber 100. The pressurized fluid is delivered to the first chamber 98 when the first valve 102 is open and the second valve 104 is closed. The pressurized fluid is delivered to the second chamber 100 and when the first valve 102 is closed and the second valve 104 is open. When the first valve 102 is opened and the second valve 104 is closed, the locking pin 86 is advanced (see FIGS. 3A and 3B) and the stem valve 90 may transition between the opened and closed positions (i.e., the stem valve 90 has not been deactivated). When the first valve 102 is closed and the second valve 104 is opened, the locking pin 86 is retracted (see FIG. 3C), the stem valve 90 remains in the closed position, and the stem valve 90 cannot transition to the opened position (i.e., the stem valve 90 has been deactivated).

The controller 54 may be configured to open and close the first valve 102 and the second valve 104 to either advance or retract the locking to pin 86 to respectively activate or deactivate the stem valve 90. More specifically, the controller 54 may be configured to activate or deactivate the air intake valve 36 and the exhaust valve 48 of a particular cylinder 14 by utilizing the mechanism 82 depicted in FIGS. 3A-3C, depending on whether the engine 12 is operating in a mode where the particular cylinder 14 is activated or operating in a skip-fire mode that requires the particular cylinder 14 to be shut down or deactivated. When the air intake valve 36 and the exhaust valve 48 of a particular cylinder 14 are deactivated, the particular cylinder 14 is also deactivated. Each valve (air intake valve 36 and exhaust valve 48) for each cylinder 14 may include an associated mechanism 82 for disabling the particular valve. The mechanism 82 depicted in FIGS. 3A-3C is not intended to be limiting. The engine 12 may be a variable displacement/skip-fire engine where the valves of a particular cylinder (and therefore the cylinder itself) may be deactivated by any method known in the art.

Figure 4A:
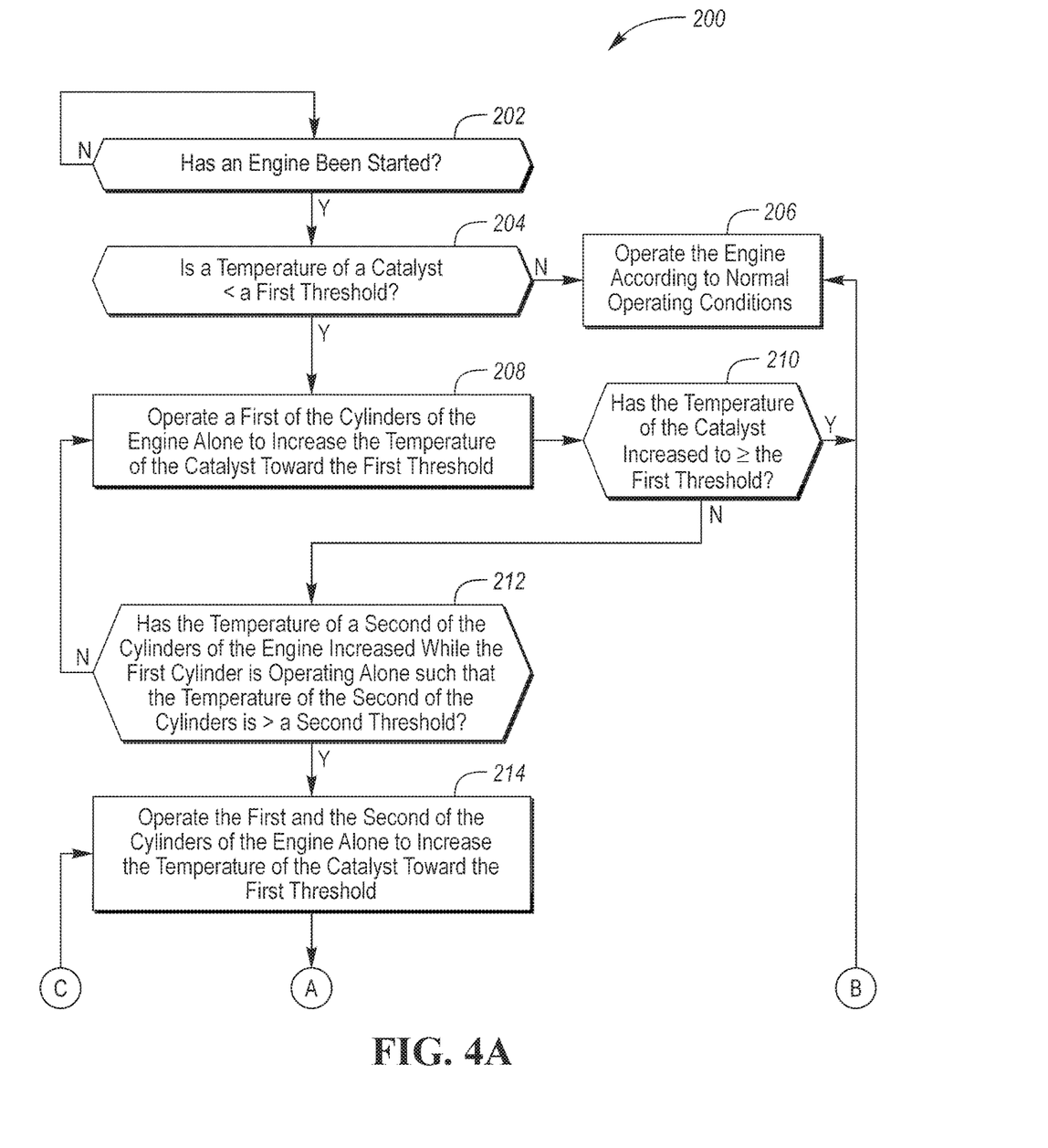
FIGS. 4A-4B illustrate a flowchart of a control method for controlling a variable displacement engine.
Figure 4B:
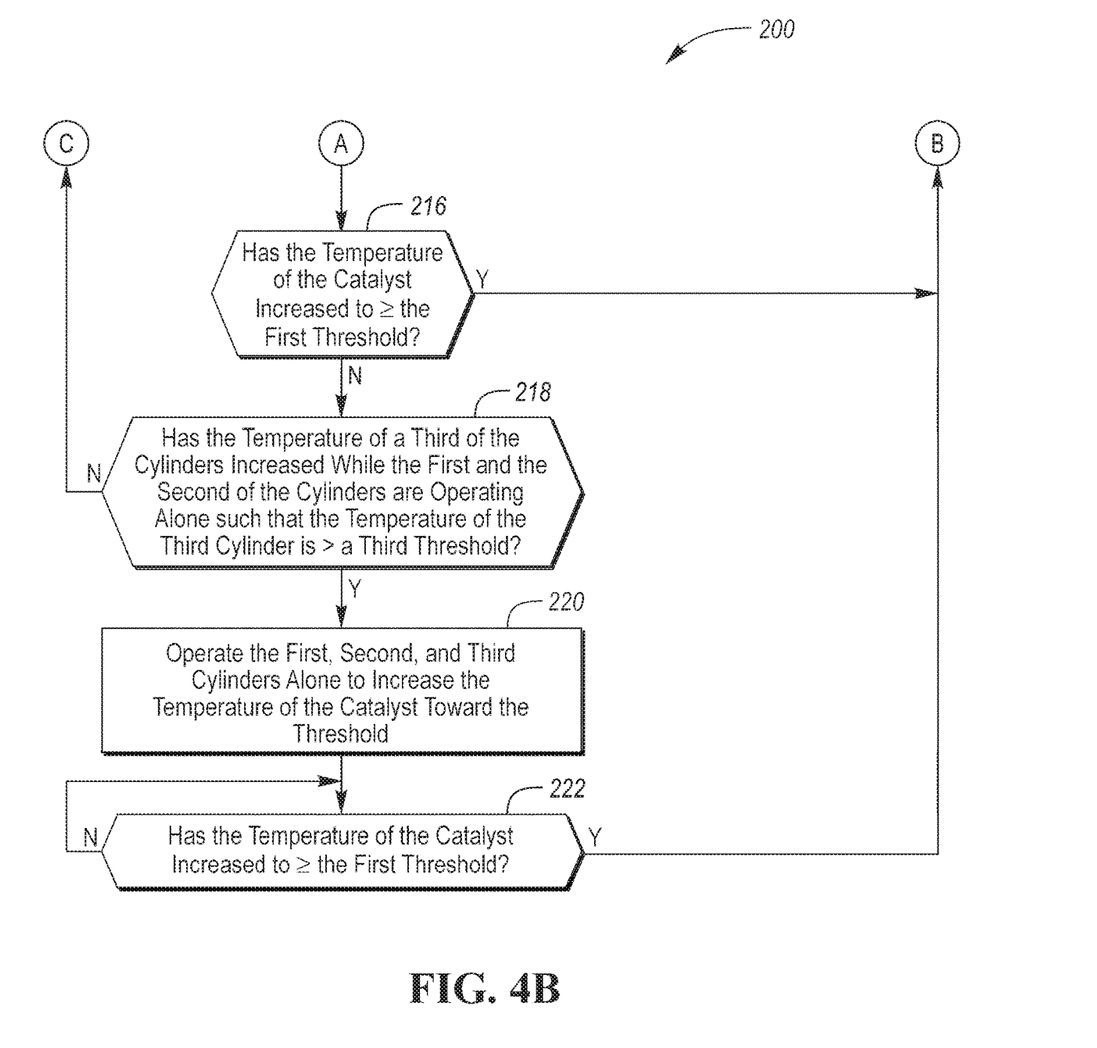

Referring to FIGS. 4A and 4B, a flowchart of a control method 200 for controlling the variable displacement or skip-fire internal combustion engine 12 is illustrated. The method 200 may be stored as control logic and/or an algorithm within the controller 54. The controller 54 may be programmed to implement the method 200 by controlling the various components of the vehicle 10. The method 200 begins at block 202 where it is determined if the engine 12 has been started. If the engine has not been started, the method 200 recycles back to the beginning of block 202. If the engine 12 has been started, the method 200 moves on to block 204 where it is determined if a temperature of a catalyst (e.g., the first catalyst 40 and/or the second catalyst 42) is less than a first threshold. The first threshold may be a light-off temperature of the catalyst. The catalyst operates most efficiently (i.e., reduces the maximum amount of emissions within the exhaust gas of the engine 12) at temperatures that are at or above the light-off temperature.

If the temperature the catalyst is not less than the first threshold (i.e., if the temperature of the catalyst is greater than or equal to the first threshold) the method 200 moves on to block 206 where the engine 12 is operated according to normal operating conditions. Normal operating conditions may include operating all of the cylinders 14 of the engine 12 or operating the engine 12 in the skip-fire mode if conditions are such that it is desirable to operate in the skip-fire mode. Returning to block 204, if the temperature of the catalyst is less than the first threshold, the method 200 moves on to block 208 where a first of the cylinders 14 is operated alone (i.e., the first of the cylinders 14 is operated while the remainder of the cylinders 14 are shut down or deactivated) to increase the temperature of the catalyst toward the first threshold.

Next, the method 200 moves on to block 210 where it is determined if the temperature of the catalyst has increased to a value that is greater than or equal to the first threshold while the first of the cylinders 14 is operated alone. If the temperature of the catalyst has increased to a value that is greater than or equal to the first threshold while the first of the cylinders 14 is operated alone, the method 200 moves on to block 206 where the engine 12 is operated according to the normal operating conditions, which may entail initiating operation of all of the remainder of the cylinders 14 or a portion of the remainder of the cylinders 14 if conditions are such that it is desirable to operate in the skip-fire mode. If the temperature of the catalyst has not increased to a value that is greater than or equal to the first threshold while the first of the cylinders 14 is operated alone (i.e., if the temperature the catalyst remains less than the first threshold), the method 200 moves on to block 212.

At block 212, it is determined if the temperature of a second of the cylinders 14 of the engine 12 has increased to a value that is greater than a second threshold, while the first of the cylinders 14 is being operated alone. The second threshold may correspond to a temperature at which initiating operation of the second of the cylinders 14 will decrease the time required to the heat the catalyst to the first threshold without increasing emissions or without increasing emissions to by value that is greater than a tolerable range. The second of the cylinders 14 may become heated via conduction through the engine block 22 while the first of the cylinders 14 is being operated alone. The second of the cylinders 14 may be adjacent or next to the first of the of cylinders 14 such that heat transfer via conduction through the engine block 22 is increased or maximized. The temperature of the second of the cylinders 14 may be determined by a temperature sensor that is in contact with the second of the cylinders 14. The temperature sensor may then communicate the temperature of the second of the cylinders 14 to the controller 54. Alternatively, the temperature of the second of the cylinders 14 may be estimated based on a known or an estimated heat transfer between the first of the cylinders 14 and the second of the cylinders 14 that occurs over a period to time to heat the second cylinder 14 to a temperature that is greater than the second threshold while the first of the cylinders 14 is operating alone. The processes that are occurring in blocks 208, 210, and 212 may occur simultaneously.

If the temperature of the second of the cylinders 14 has not increased to a value that is greater than the second threshold, while the first of the cylinders 14 is being operated alone, the method recycles back to block 208 and eventually to block 210 and/or block 212. If the temperature of the second of the cylinders 14 has increased to a value that is greater than the second threshold, the method 200 moves on to block 214, where operation of the second of the cylinders 14 is initiated such that the first and the second of the cylinders 14 of the engine 12 are operated alone (i.e., the first and the second of the cylinders 14 are operated while the remainder of the cylinders 14 are shut down or deactivated) to increase the temperature of the catalyst toward the first threshold.

Next, the method 200 moves on to block 216 where it is determined if the temperature of the catalyst has increased to a value that is greater than or equal to the first threshold while the first and the second of the cylinders 14 are operated alone. If the temperature of the catalyst has increased to a value that is greater than or equal to the first threshold while the first and the second of the cylinders 14 are operated alone, the method 200 moves on to block 206 where the engine 12 is operated according to the normal operating conditions, which may entail initiating operation of all of the remainder of the cylinders 14 or a portion of the remainder of the cylinders 14 if conditions are such that it is desirable to operate in the skip-fire mode. If the temperature of the catalyst has not increased to a value that is greater than or equal to the first threshold while the first of the cylinders 14 is operated alone (i.e., if the temperature the catalyst is less than the first threshold), the method 200 moves on to block 218.

At block 218, it is determined if the temperature of a third of the cylinders 14 of the engine 12 has increased to a value that is greater than a third threshold, while the first and the second of the cylinders 14 are being operated alone. The third threshold may correspond to a temperature at which initiating operation of the third of the cylinders 14 will decrease the time required to the heat the catalyst to the first threshold without increasing emissions or without increasing emissions by a value that is greater than a tolerable range. The third of the cylinders 14 may become heated via conduction through the engine block 22 while the first and the second of the cylinders 14 are being operated alone. The third of the cylinders 14 may be adjacent or next to the first and/or the second of the of cylinders 14 such that heat transfer via conduction through the engine block 22 is increased or maximized. The temperature of the third of the cylinders 14 may be determined by a temperature sensor that is in contact with the third of the cylinders 14. The temperature sensor may then communicate the temperature of the third of the cylinders 14 to the controller 54. Alternatively, the temperature of the third of the cylinders 14 may be estimated based on a known or an estimated heat transfer between the first and/or the second of the cylinders 14 and the third of the cylinders 14 that occurs over a period to time to heat the third cylinder 14 to a temperature that is greater than the third threshold while the first and the second of the cylinders 14 are operating alone. The processes that are occurring in blocks 214, 216, and 218 may occur simultaneously.

If the temperature of the third of the cylinders 14 has not increased to a value that is greater than the third threshold, while the first and the second of the cylinders 14 are being operated alone, the method 200 recycles back to block 214 and eventually to block 216 and/or block 218. If the temperature of the third of the cylinders 14 has increased to a value that is greater than the third threshold, the method 200 moves on to block 220, where operation of the third of the cylinders 14 is initiated such that the first, the second, and the third of the cylinders 14 of the engine 12 are operated alone (i.e., the first, the second, and the third of the cylinders 14 are operated while the remainder of the cylinders 14 are shut down or deactivated) to increase the temperature of the catalyst toward the first threshold.

Next, the method 200 moves on to block 222 where it is determined if the temperature of the catalyst has increased to a value that is greater than or equal to the first threshold while the first, the second, and the third of the cylinders 14 are operated alone. If the temperature of the catalyst has increased to a value that is greater than or equal to the first threshold while the first, the second, and the third of the cylinders 14 are operated alone, the method 200 moves on to block 206 where the engine 12 is operated according to the normal operating conditions, which may entail initiating operation of all of the remainder of the cylinders 14 or a portion of the remainder of the cylinders 14 if conditions are such that it is desirable to operate in the skip-fire mode. If the temperature of the catalyst has not increased to a value that is greater than or equal to the first threshold while the first, second, and third of the cylinders 14 are operated alone, the method 200 may recycle back to block 220. Alternative, if the temperature of the catalyst has not increased to a value that is greater than or equal to the first threshold while the first, second, and third of the cylinders 14 are operated alone, the method 200 may begin operation addition cylinders 14, similar to the initiating of operation of the second and third of the cylinders 14 (e.g., adjacent cylinders may be brought into operation once they have reach a temperature at which initiating operation of the cylinders 14 will decrease the time required to the heat the catalyst to the first threshold without increasing emissions or without increasing emissions by a value that is greater than a tolerable range).

The order at which operation of the cylinders 14 is initiated, after starting the engine 12 to heat the catalyst, may be based on several alternative factors. For example, alternatively to initiating the operation of the cylinders 14 in an order that is based on the temperature of the cylinders 14, as described according to method 200, the operation of the cylinders 14 may be initiated in an order that ranges from which of cylinders 14 is closest to catalyst 40 along a path of the exhaust conduit 38 to which of the cylinders 14 is furthest from the catalyst 40 along the path of the exhaust conduit 38 (e.g., the first cylinder 14 is closer to the catalyst than the second and third cylinders 14, while the second cylinder 14 is closer to the catalyst 40 than the third cylinder 40). Stated in other terms, a distance from the first of the plurality of cylinders 14 to the catalyst 40 along the exhaust conduit or pipe 38 may be less than a distance from each of a remainder of the plurality of cylinders 14 to the catalyst 40 along the exhaust conduit or pipe 38, and a distance from the second of the plurality of cylinders 14 to the catalyst 40 along the exhaust conduit or pipe 38 may be less than a distance from each of a remainder of the plurality of cylinders 14 to the catalyst 40 along the exhaust conduit or pipe 38, other than the first of the cylinders 14.

In another alternative, the operation of the cylinders 14 may be initiated in an order that ranges from which of cylinders 14 produces a stream of exhaust gas that has an area of distribution on a front face of the catalyst 40 that is largest to which of cylinders 14 produces a stream of exhaust gas that has an area of distribution on the front face of the catalyst 40 that is the smallest. as opposed to initiating the operation of the cylinders 14 in an order that is based on the temperature of the cylinders 14, as described according to method 200. For example, the first cylinder 14 may produce a stream of exhaust gas that has an area of distribution on the front face of the catalyst 40 that is larger than the areas of distribution on the front face of the catalyst 40 from the streams of exhaust gas produced by the remainder of the cylinders 14, while the second cylinder 14 may produce a stream of exhaust gas that has an area of distribution on the front face of the catalyst 40 that is larger than the areas of distribution on the front face of the catalyst 40 from the streams of exhaust gas produced by the remainder of the cylinders 14, other than the first of the cylinders 14.

In yet another alternative, the operation of the cylinders 14 may be initiated in method 200 in an order that ranges from which of cylinders 14 produces the least amount of emissions or particulate matter to which of cylinders 14 produces largest amount of emissions or particulate matter, as opposed to initiating the operation of the cylinders 14 in an order that is based on the temperature of the cylinders 14, as described according to method 200. This may be determined by operating each cylinder 14 separately and recording the emissions produced by each cylinder via the first lambda or oxygen sensor 62 or recording the amount of particulate matter produced by each cylinder via the particulate sensor 66.

The method 200 may be employed separately by individual banks of cylinders 14 (e.g., first bank 78 and second bank 80 of cylinders 14) if the engine 12 includes multiple banks of cylinders where each bank has a separate exhaust system that includes a separate catalyst or catalytic converter. It should be understood that the flowchart depicted in FIGS. 4A and 4B is for illustrative purposes only and that the method 200 should not be construed as limited to the flowchart in FIGS. 4A and 4B. Some of the steps of the method 200 may be rearranged while others may be omitted entirely.

Figure 5:
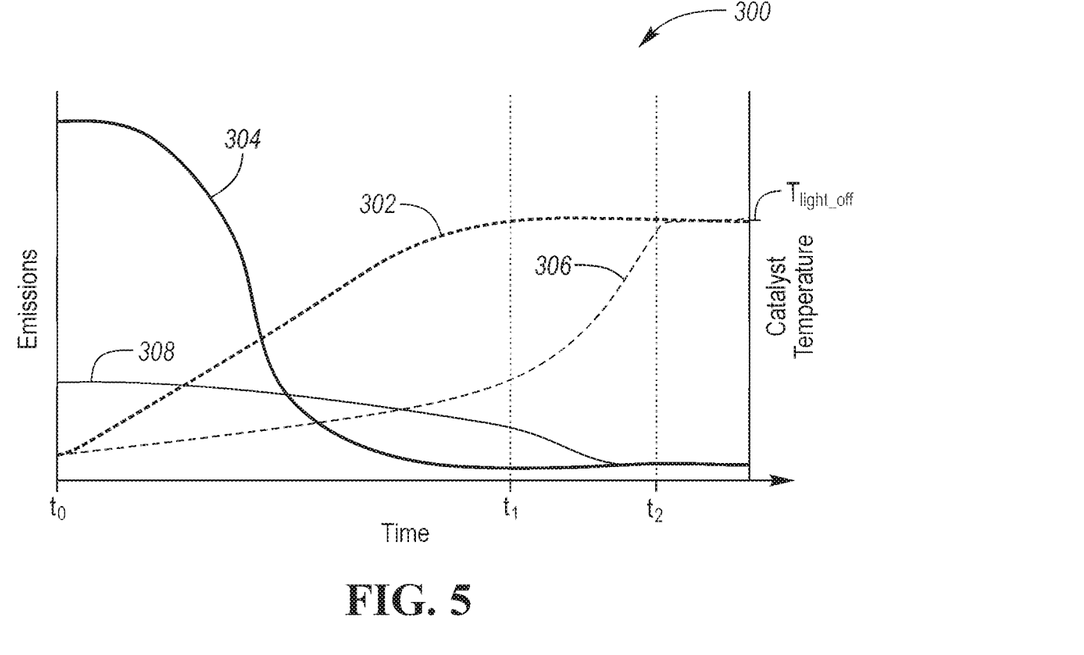
FIG. 5 is a graph comparing the difference between the total emissions produced when a single cylinder of an engine is utilized to heat the catalyst to the light-off temperature and the total emissions produced when all of the cylinders of the engine are utilized to heat the catalyst to the light-off temperature is illustrated.

Referring to FIG. 5, a graph 300 comparing the difference between the total emissions produced when a single cylinder 14 of an engine 12 is utilized to heat the catalyst 40 to the light-off temperature and the total emissions produced when all of the cylinders 14 of the engine 12 are utilized to heat the catalyst 40 to the light-off temperature is illustrated. Line 302 represents the temperature of the catalyst 40 over time when all of the cylinders 14 of the engine 12 are utilized to heat the catalyst 40 to the light-off temperature after a cold start of the engine 12 and line 304 represents the rate at which emissions are being expelled from the exhaust system 20 into the ambient air when all of the cylinders 14 of the engine 12 are utilized to heat the catalyst 40 to the light-off temperature after a cold start of the engine 12. Line 306 represents the temperature of the catalyst 40 over time when one of the cylinders 14 of the engine 12 is utilized to heat the catalyst 40 to the light-off temperature after a cold start of the engine 12 and line 308 represents the rate at which emissions are being expelled from the exhaust system 20 into the ambient air when one of the cylinders 14 of the engine 12 is utilized to heat the catalyst 40 to the light-off temperature after a cold start of the engine 12.

When all the cylinders 14 are utilized to heat the catalyst 40 to the light-off temperature $T_{light\_off}$, the catalyst 40 reaches the light-off temperature $T_{light\_off}$ at time $t_1$. When one of the cylinders 14 is utilized to heat the catalyst 40 to the light-off temperature $T_{light\_off}$, the catalyst reaches the light-off temperature $T_{light\_off}$ at time $t_2$, which occurs after time $t_1$. The total amount of emissions produced when all of the cylinders 14 are utilized to heat the catalyst 40 to the light-off temperature $T_{light\_off}$ is represented by the area under line 304 between times $t_0$ and $t_1$. The total amount of emissions produced when one of the cylinders 14 is utilized to heat the catalyst 40 to the light-off temperature $T_{light\_off}$ is represented by the area under line 308 between times $t_0$ and $t_2$, which is smaller than the area under line 304 between times $t_0$ and $t_1$. Therefore, it can be understood from the graph 300 that decreasing the number of cylinders 14 of the engine 12 to heat the catalyst 40 to the light-off temperature $T_{light\_off}$ results in reducing the total number of emissions produced by the engine 12 that are expelled from the exhaust system 20 into the ambient air. However, decreasing the number of cylinders 14 of the engine 12 to heat the catalyst to the light-off temperature $T_{light\_off}$ also results increasing the time period required to heat the catalyst 40 to the light-off temperature $T_{light\_off}$. Therefore, the number of cylinders 14 that are utilized to heat the catalyst 40 to the light-off temperature $T_{light\_off}$ may be adjusted depending on whether or not the goal is to reduce total amount of emissions while heating the catalyst 40 to the light-off temperature $T_{light\_off}$ or to reduce the time period required to heat the catalyst 40 to the light-off temperature $T_{light\_off}$.

Figure 6:
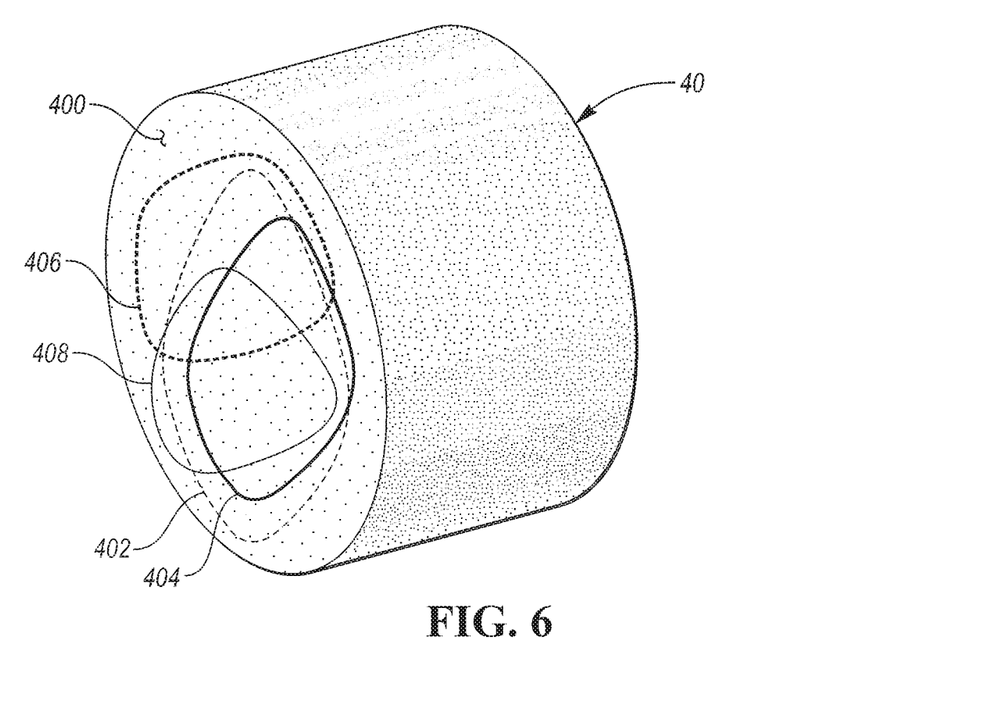
FIG. 6 illustrates an exhaust gas distribution over a front face of a catalyst.

FIG. 6 illustrates an exhaust gas distribution over a front face 400 of the catalyst 40. Each stream of exhaust gas from each cylinder 14 has an area of distribution on the front face 400 of the catalyst 40. Area 402 represents the largest area of distribution of exhaust gas, which is produced by a first cylinder, area 404 represents the second largest area of distribution of exhaust gas, which is produced by a second cylinder, area 406 represents the third largest and second smallest area of distribution of exhaust gas, which is produced by a third cylinder, and area 408 represents the smallest area of distribution of exhaust gas, which is produced by a fourth cylinder. As previously stated, the method 200 may be configured to initiate operation of the cylinders 14 in an order that ranges from which of the cylinders 14 produces a stream of exhaust gas that has an area of distribution on the front face 400 of the catalyst 40 that is largest to which of cylinders 14 produces a stream of exhaust gas that has an area of distribution of exhaust gas on the front face of the catalyst 40 that is the smallest. Therefore, the method 200 may initiate operations of the cylinders 14 in an order that starts with the first cylinder 14, followed by the second cylinder 14, followed by the third cylinder 14, and ending with the fourth cylinder 14.

It should be understood that the designations of first, second, third, fourth, etc. for cylinders, valves, sensors, or any other state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an internal combustion engine having a plurality of cylinders;
   a conduit configured to channel exhaust gas away from the cylinders and to a catalyst; and
   a controller programmed to, in response to starting the engine and a temperature of the catalyst being less than a threshold, operate a first of the plurality of cylinders alone followed by operating the first and a second of the plurality of cylinders alone to increase the temperature of the catalyst toward the threshold.

2. The vehicle of claim 1, wherein the controller is further programmed to, in response to a temperature of the second of the plurality of cylinders exceeding a second threshold while the first of the plurality of cylinders is operating alone, initiate operation of the second of the plurality of cylinders in conjunction with the first of the plurality of cylinders to increase the temperature of the catalyst toward the threshold.

3. The vehicle of claim 2, wherein the second of the plurality of cylinders is adjacent to the first of the plurality of cylinders.

4. The vehicle of claim 2, wherein the controller is further programmed to, in response to a temperature of a third of the plurality of cylinders exceeding a third threshold while the first and the second of the plurality of cylinders are operating alone to increase the temperature of the catalyst, initiate operation of the third of the plurality of cylinders in conjunction with the first and the second of the plurality of cylinders to increase the temperature of the catalyst toward the threshold.

5. The vehicle of claim 4, wherein the third of the plurality of cylinders is adjacent to the first of the plurality of cylinders.

6. The vehicle of claim 1, wherein the threshold is a light-off temperature of the catalyst.

7. The vehicle of claim 6, wherein the controller is further programmed to, in response the temperature of the catalyst exceeding the light-off temperature, initiate operation of a remainder of the plurality of cylinders.

8. The vehicle of claim 1, wherein a distance from the first of the plurality of cylinders to the catalyst along the conduit is less than a distance from each of a remainder of the plurality of cylinders to the catalyst along the conduit, and a distance from the second of the plurality of cylinders to the catalyst along the conduit is less than the distance from each of the remainder of the plurality of cylinders to the catalyst along the conduit other than the distance from the first of the plurality of cylinders to the catalyst along the conduit.

9. The vehicle of claim 1, wherein an area of distribution of exhaust gas from the first of the plurality of cylinders on a front face of the catalyst is greater than an area of distribution of exhaust gas from each of a remainder of the plurality of cylinders on the front face of the catalyst, an area of distribution of exhaust gas from the second of the plurality of cylinders on the front face of the catalyst is greater than the area of distribution of exhaust gas from each of the remainder of the plurality of cylinders on the front face of the catalyst other than the area of distribution of exhaust gas from the first of the plurality of cylinders on the front face of the catalyst.

10. The vehicle of claim 1, wherein the emission gases produced by the first of the plurality of cylinders is less than the emission gases produced by each of the remainder of the plurality of cylinders, and the emission gases produced by the second of the plurality of cylinders is less than the emission gases produced by each of the remainder of the plurality of cylinders, other than the emission gases produced by the first of the plurality of cylinders.

11. A method of heating a catalyst in a vehicle comprising:
   in response to starting an engine and a temperature of the catalyst being less than a threshold,
      operating a first of a plurality of cylinders in the engine alone to produce exhaust gas to increase the temperature of the catalyst toward the threshold, and
      operating the first and a second of the plurality of cylinders in the engine alone, after operating the first cylinder alone, to produce exhaust gas to increase the temperature of the catalyst toward the threshold, wherein the second cylinder is adjacent to the first cylinder.

12. The method of claim 11 further comprising:
in response to a temperature of the second of the plurality of cylinders exceeding a second threshold while the first of the plurality of cylinders is operating alone, initiate operating the second of the plurality of cylinders in conjunction with the first of the plurality of cylinders to increase the temperature of the catalyst toward the threshold.

13. The method of claim 12 further comprising:
in response to a temperature of a third of the plurality of cylinders exceeding a third threshold while the first and the second of the plurality of cylinders are operating alone to increase the temperature of the catalyst, initiate operation of the third of the plurality of cylinders in conjunction with the first and the second of the plurality of cylinders to increase the temperature of the catalyst toward the threshold, wherein the third cylinder is adjacent to the first cylinder.

14. The method of claim 11, wherein the threshold is a light-off temperature of the catalyst.

15. The method of claim 14 further comprising:
in response to the temperature of the catalyst exceeding the light-off temperature, initiate operating a remainder of the plurality of cylinders.

16. A vehicle comprising:
an internal combustion engine having first and second banks of cylinders;
an exhaust pipe configured to channel exhaust gas away from the first bank of cylinders and to a catalytic converter; and
a controller programmed to, in response to starting the engine and a temperature of the catalytic converter being less than a threshold, operate a first cylinder from the first bank of cylinders alone followed by operating the first cylinder and a second cylinder from first bank of cylinders alone to increase the temperature of the catalytic converter toward the threshold.

17. The vehicle of claim 16, wherein second cylinder is adjacent to the first cylinder.

18. The vehicle of claim 16 further comprising:
a second exhaust pipe configured to channel exhaust gas away from the second bank of cylinders and to a second catalytic converter, and wherein the controller is further programmed to, in response to starting the engine and a temperature of the second catalytic converter being less than the threshold, operate a first cylinder from the second bank of cylinders alone followed by operating the first cylinder and a second cylinder from second bank of cylinders alone to increase the temperature of the second catalytic converter toward the threshold.

19. The vehicle of claim 18, wherein second cylinder from second bank of cylinders is adjacent to the first cylinder from second bank of cylinders.

20. The vehicle of claim 16, wherein the threshold is a light-off temperature of the catalytic converter.

* * * * *